US012766466B2

(12) United States Patent
Qiu et al.

(10) Patent No.: US 12,766,466 B2
(45) Date of Patent: Oct. 20, 2026

(54) REVERSE OSMOSIS FILTRATION SYSTEM

(71) Applicant: Solventum Intellectual Properties Company, Maplewood, MN (US)

(72) Inventors: Biyong Qiu, Shanghai (CN); Yan Liu, Shanghai (CN)

(73) Assignee: Solventum Intellectual Properties Company, Eagan, MN (US)

( * ) Notice: Subject to any disclaimer, the term of this patent is extended or adjusted under 35 U.S.C. 154(b) by 413 days.

(21) Appl. No.: 18/259,689

(22) PCT Filed: Dec. 30, 2020

(86) PCT No.: PCT/CN2020/141246
§ 371 (c)(1),
(2) Date: Jun. 28, 2023

(87) PCT Pub. No.: WO2022/141154
PCT Pub. Date: Jul. 7, 2022

(65) Prior Publication Data
US 2024/0066469 A1 Feb. 29, 2024

(51) Int. Cl.
*B01D 61/12* (2006.01)
*B01D 61/02* (2006.01)
(Continued)

(52) U.S. Cl.
CPC ........... *B01D 61/12* (2013.01); *B01D 61/025* (2013.01); *B01D 61/081* (2022.08); *C02F 1/441* (2013.01);
(Continued)

(58) Field of Classification Search
None
See application file for complete search history.

(56) References Cited

U.S. PATENT DOCUMENTS 4,773,991 A * 9/1988 Aid ........................ B01D 61/12 210/257.2
5,520,816 A * 5/1996 Kuepper .............. B01D 61/081 210/744
(Continued)

FOREIGN PATENT DOCUMENTS

CN 103253781 A 8/2013
CN 104003542 A 8/2014
(Continued)

OTHER PUBLICATIONS

International Search Report received for PCT International Application No. PCT/CN2020/141246, mailed on Sep. 28, 2021, 5 pages.

*Primary Examiner* — Krishnan S Menon

(57) ABSTRACT

A reverse osmosis filtration system (100, 100A, 100B, 100C), comprising: a raw water pipeline (L1); a reverse osmosis filtration unit (10, 10A, 10B, 10C) configured to filter raw water supplied by the raw water pipeline (L1); and a faucet (30, 30A, 30B, 30C) connected to the reverse osmosis filtration unit (10, 10A, 10B, 10C), wherein the faucet (30, 30A, 30B, 30C) is operable such that a water outlet (33) of the faucet (30, 30A, 30B, 30C) is selectively in communication with a product water outflow pipeline of the reverse osmosis filtration unit (10, 10A, 10B, 10C). The reverse osmosis filtration system (100, 100A, 100B, 100C) further comprises a pump unit (50, 50A, 50B, 50C) arranged between the raw water pipeline (L1) and the reverse osmosis filtration unit (10, 10A, 10B, 10C), wherein the pump unit (50, 50A, 50B, 50C) is configured to selectively pump the raw water in the raw water pipeline (L1) to the reverse osmosis filtration unit (10, 10A, 10B, 10C) according to a pressure in the product water outflow pipeline. The reverse osmosis filtration system (100, 100A, 100B, 100C) can operate stably even when a pressure in the raw water pipeline (L1) is low, can provide the operation stability of
(Continued)

the reverse osmosis filtration system (100, 100A, 100B, 100C), and can realize on-demand water supply for the reverse osmosis filtration unit (10, 10A, 10B, 10C).

13 Claims, 4 Drawing Sheets

(51) Int. Cl.
*B01D 61/08* (2006.01)
*C02F 1/44* (2023.01)

(52) U.S. Cl.
CPC .... *B01D 2313/243* (2013.01); *C02F 2209/03* (2013.01); *C02F 2301/043* (2013.01)

(56) References Cited

U.S. PATENT DOCUMENTS

| | | | | |
|---|---|---|---|---|
| 2013/0037464 | A1* | 2/2013 | Friedrichsen .......... | B01D 61/06 210/321.66 |
| 2019/0070559 | A1 | 3/2019 | Qiu | |

FOREIGN PATENT DOCUMENTS

| | | | |
|---|---|---|---|
| CN | 105502717 | A | 4/2016 |
| CN | 205709995 | U | 11/2016 |
| CN | 109534450 | A | 3/2019 |
| CN | 211170262 | U | 8/2020 |
| CN | 112759097 | A | 5/2021 |
| JP | 2006289334 | A | 10/2006 |
| WO | 2014058724 | A1 | 4/2014 |

* cited by examiner

REVERSE OSMOSIS FILTRATION SYSTEM

CROSS REFERENCE TO RELATED APPLICATIONS

This application is a national stage filing under 35 U.S.C. 371 of PCT/CN2020/141246, filed Dec. 30, 2020, the disclosure of which is incorporated by reference in its/their entirety herein.

FIELD

The present application relates to the field of filtration, and more specifically, relates to a reverse osmosis filtration system.

BACKGROUND

The content of this part provides only background information related to the present application, and does not necessarily constitute the prior art.

Filtration systems are widely applied in industrial production and daily life, and are often used for filtration of various fluids. With the improvement of living standards, filtration systems are widely applied in the filtration of residential water to eliminate water pollution and the impact on water quality from water sources, transportation processes, and the like, thus ensuring the water use safety. A reverse osmosis filtration system is a commonly used filtration system in filtration of drinking water for residents. The reverse osmosis filtration system is classified into an air-to-water reverse osmosis filtration system and a water-to-water reverse osmosis filtration system according to methods of providing a back pressure of a pure water chamber. In the air-to-water reverse osmosis filtration system, a pressure chamber of a water storage tank provides a back pressure for the pure water chamber by containing air or other gases. In the water-to-water reverse osmosis filtration system, a pressure chamber of a water storage tank contains concentrated water flowing out from a reverse osmosis membrane filter element, and inflow and outflow of the concentrated water in the pressure chamber are controlled according to a pipeline pressure in the filtration system. Therefore, a stable back pressure can be provided for the pure water chamber, and thus stable product water can be provided, so the water-to-water reverse osmosis filtration system is very popular.

In a household reverse osmosis filtration system, raw water of the reverse osmosis filtration system is usually provided by a municipal tap water pipeline. When the municipal tap water supply is stable, the reverse osmosis filtration system can operate stably to provide stable product water. However, when a water supply pressure of the municipal tap water is unstable or the water supply pressure is low, the reverse osmosis filtration system cannot operate stably, which is likely to cause dissatisfaction of users.

Therefore, it is desired to propose a new reverse osmosis filtration system, which can operate stably even when the pressure of the raw water pipeline is low, thus expanding an operating pressure range of the reverse osmosis filtration system.

SUMMARY

An objective of the present application is to provide a reverse osmosis filtration system capable of improving the operation stability thereof, such that it can operate stably even when a pressure in a raw water pipeline is low.

One aspect of the present application is to provide a reverse osmosis filtration system, comprising: a raw water pipeline; a reverse osmosis filtration unit configured to filter raw water supplied by the raw water pipeline; and a faucet installed to the reverse osmosis filtration unit, wherein the faucet is operable such that a water outlet of the faucet is selectively in communication with a product water outflow pipeline of the reverse osmosis filtration unit. The reverse osmosis filtration system further comprises a pump unit arranged between the raw water pipeline and the reverse osmosis filtration unit, wherein the pump unit is configured to selectively pump the raw water in the raw water pipeline to the reverse osmosis filtration unit according to a pressure in the product water outflow pipeline.

In one embodiment, the pump unit comprises a pump and a bypass pipeline. The pump is connected between the raw water pipeline and the reverse osmosis filtration unit, and the pump is configured to selectively pump the raw water in the raw water pipeline to the reverse osmosis filtration unit. The bypass pipeline is configured to bypass the pump such that the raw water in the raw water pipeline can be supplied to the reverse osmosis filtration unit through the bypass pipeline.

In one embodiment, the pump unit further comprises: a low-pressure control portion configured to control the pump according to a pressure in the raw water pipeline, wherein when the pressure in the raw water pipeline is less than a raw water pressure threshold, the low-pressure control portion disables the pump; and a high-pressure control portion configured to control the pump according to the pressure in the product water outflow pipeline, wherein when the pressure in the product water outflow pipeline is greater than or equal to a product water pressure threshold, the high-pressure control portion disables the pump. When the pressure in the raw water pipeline is greater than or equal to the raw water pressure threshold, and the pressure in the product water outflow pipeline is less than the product water pressure threshold, the pump works to pump the raw water in the raw water pipeline to the reverse osmosis filtration unit.

In one embodiment, the pump unit further comprises a power supply apparatus arranged to supply power to the pump. When the pressure in the raw water pipeline is less than the raw water pressure threshold, the low-pressure control portion turns off an electrical connection between the power supply apparatus and the pump.

In one embodiment, the high-pressure control portion is electrically connected in series between the power supply apparatus and the pump, and is configured to be turned on or turned off selectively according to the pressure in the product water outflow pipeline.

In one embodiment, the product water outflow pipeline comprises a first product water outflow pipeline, and the faucet is operable such that the water outlet is selectively in communication with the first product water outflow pipeline. The high-pressure control portion comprises a first high-pressure protection pressure switch electrically connected in series between the power supply apparatus and the pump, and a fluid inlet of the first high-pressure protection pressure switch is connected to the first product water outflow pipeline. The first high-pressure protection pressure switch is configured such that: when a pressure in the first product water outflow pipeline is less than a first pressure threshold, the first high-pressure protection pressure switch is turned on; and when the pressure in the first product water outflow pipeline is greater than or equal to the first pressure threshold, the first high-pressure protection pressure switch is turned off.

In one embodiment, the product water outflow pipeline further comprises a second product water outflow pipeline, and the faucet is operable such that the water outlet is selectively in communication with one or both of the first product water outflow pipeline and the second product water outflow pipeline. The high-pressure control portion further comprises a second high-pressure protection pressure switch. A fluid inlet of the second high-pressure protection pressure switch is connected to the second product water outflow pipeline, and the second high-pressure protection pressure switch and the first high-pressure protection pressure switch are electrically connected in parallel between the power supply apparatus and the pump. The second high-pressure protection pressure switch is configured such that: when a pressure in the second product water outflow pipeline is less than a second pressure threshold, the second high-pressure protection pressure switch is turned on; and when the pressure in the second product water outflow pipeline is greater than or equal to the second pressure threshold, the second high-pressure protection pressure switch is turned off.

In one embodiment, the product water outflow pipeline comprises a first product water outflow pipeline, and the faucet is operable such that the water outlet is selectively in communication with the first product water outflow pipeline. The high-pressure control portion comprises: a first pressure sensing element arranged to detect a pressure of the first product water outflow pipeline; and a controller configured to: receive a first pressure signal from the first pressure sensing element, wherein when the first pressure signal indicates that the pressure in the first product water outflow pipeline is less than a first pressure threshold, the controller allows the pump to work when it is powered.

In one embodiment, the product water outflow pipeline further comprises a second product water outflow pipeline, and the faucet is operable such that the water outlet is selectively in communication with one or both of the first product water outflow pipeline and the second product water outflow pipeline. The high-pressure control portion further comprises a second pressure sensing element arranged to detect a pressure of the second product water outflow pipeline. The controller is configured to: further receive a second pressure signal from the second pressure sensing element, wherein when the first pressure signal indicates that the pressure in the first product water outflow pipeline is less than the first pressure threshold, and/or the second pressure signal indicates that the pressure in the second product water outflow pipeline is less than a second pressure threshold, the controller allows the pump to work when it is powered; and when the first pressure signal indicates that the pressure in the first product water outflow pipeline is greater than or equal to the first pressure threshold, and the second pressure signal indicates that the pressure in the second product water outflow pipeline is greater than or equal to the second pressure threshold, the controller disables the pump (52).

The first pressure sensing element and/or the second pressure sensing element is a pressure sensor or a high-pressure protection pressure switch.

In one embodiment, the pump is a speed-variable pump, and the high-pressure control portion is configured to control a rotational speed of the pump according to the pressure in the product water outflow pipeline.

In one embodiment, the pump unit further comprises a filter arranged upstream of the low-pressure control portion.

In one embodiment, the reverse osmosis filtration unit comprises a reverse osmosis filtration apparatus, the first product water outflow pipeline is a pure water outflow pipeline of the reverse osmosis apparatus, and the first pressure threshold is a water storage pressure threshold of the reverse osmosis filtration apparatus.

In one embodiment, the reverse osmosis filtration unit comprises a reverse osmosis filtration apparatus and a preliminary filtration apparatus located upstream of the reverse osmosis filtration apparatus. The first product water outflow pipeline is a pure water outflow pipeline of the reverse osmosis apparatus, and the first pressure threshold is a water storage pressure threshold of the reverse osmosis filtration apparatus. The second product water outflow pipeline is a purified water outflow pipeline, and the raw water, after being filtered by the preliminary filtration apparatus, can flow to the faucet through the purified water outflow pipeline, and/or flow to the reverse osmosis filtration apparatus.

In one embodiment, the raw water pipeline is connected to a municipal tap water pipeline or a water storage container.

By adding the external pump unit to the reverse osmosis filtration unit, the present application enables the reverse osmosis filtration system to work stably even when the pressure in the raw water pipeline is low. Moreover, by arranging the bypass pipeline in the pump unit, a pump with a lower power is allowed to be used, such that the noise and vibration generated by the pump in the working process can be reduced, and the cost can be reduced. In addition, by separately measuring the pressure of each product water outflow pipeline of the reverse osmosis filtration unit, the working state of the reverse osmosis filtration unit can be accurately determined to realize on-demand water supply.

BRIEF DESCRIPTION OF DRAWINGS

Embodiments of the present application are described below merely as examples with reference to the accompanying drawings. In the accompanying drawings, the same features or components are represented by the same reference numerals, and the accompanying drawings are not necessarily drawn to scale. Further, in the accompanying drawings.

DETAILED DESCRIPTION

Figure 1:
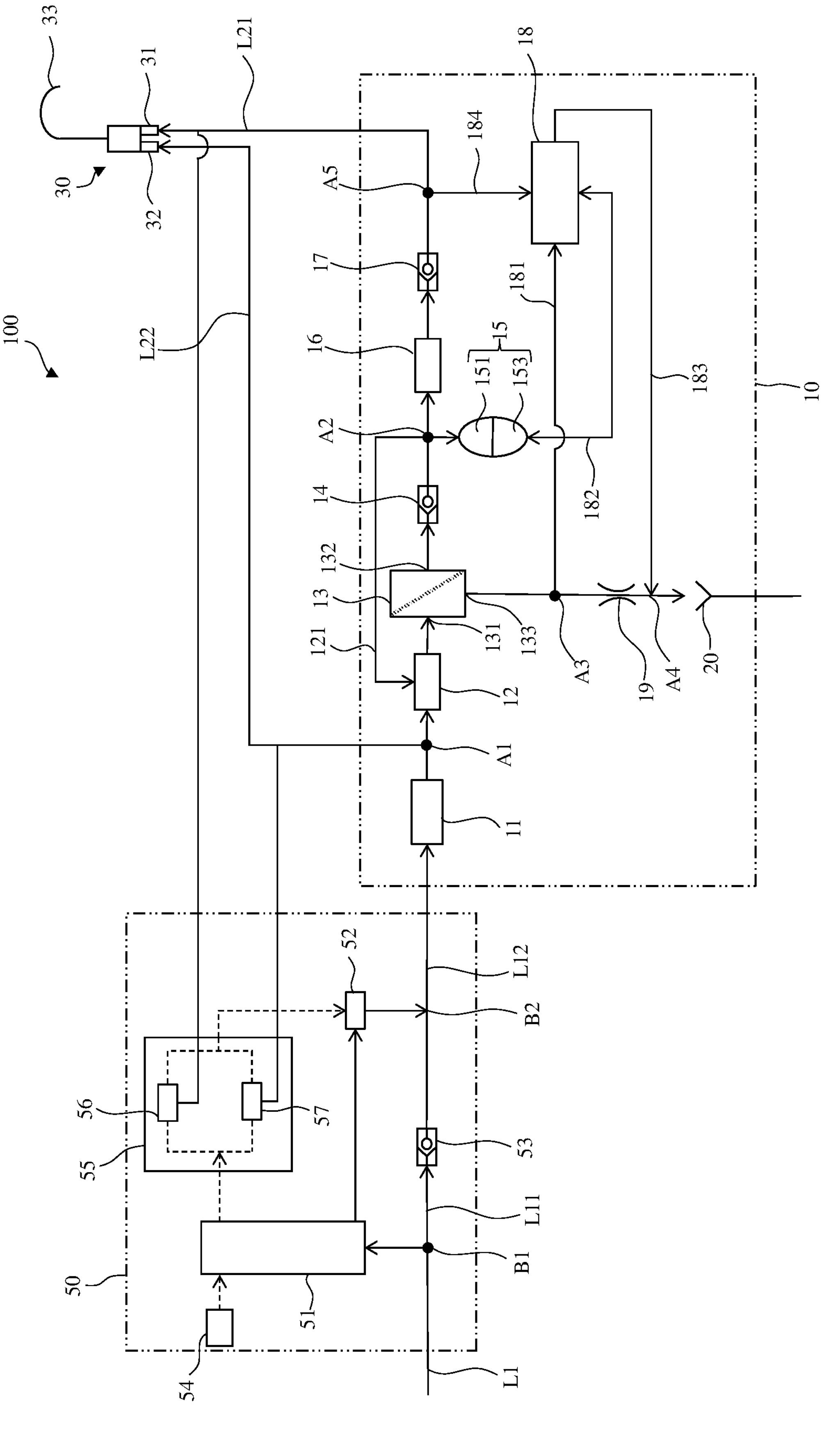
FIG. 1 shows a schematic block diagram of a reverse osmosis filtration system according to a first embodiment of the present application.

The following description is merely exemplary in nature and is not intended to limit the present application, applications, and uses. It should be understood that in all these accompanying drawings, similar reference numerals indicate the same or similar components and features. The accompanying drawings illustratively show the idea and principles of the embodiments of the present application, but do not necessarily show specific size of each embodiment of the present application and the scale thereof. In some parts of specific accompanying drawings, related details or structures of the embodiments of the present application may be illustrated in an exaggerated manner.

The reverse osmosis filtration system according to the present application may be used to filter municipal tap water, and may also be used to filter other fluids. The reverse osmosis filtration system according to the present application will be illustrated below with reference to the accompanying drawings by taking the application of the reverse osmosis filtration system in municipal tap water filtration as an example.

FIG. 1 shows a schematic block diagram of a reverse osmosis filtration system 100 according to a first embodiment of the present application.

As shown in FIG. 1, the reverse osmosis filtration system 100 includes a reverse osmosis filtration unit 10 and a faucet 30. The faucet 30 is installed to the reverse osmosis filtration unit 10, such that a water inlet of the faucet 30 is in communication with a product water outflow pipeline of the reverse osmosis filtration unit 10. The reverse osmosis filtration unit 10 is used to filter raw water (for example, the municipal tap water) and supply the filtered product water to the faucet 30 for use. As shown in FIG. 1, the reverse osmosis filtration unit 10 includes a preliminary filtration apparatus 11 and a reverse osmosis filtration apparatus. The preliminary filtration apparatus 11 is configured to perform preliminary filtration on the raw water (the municipal tap water) supplied from a raw water pipeline (a tap water pipe) L1, for filtering out harmful pollutants in the raw water but retaining minerals in the raw water to obtain purified water containing minerals. The preliminary filtration apparatus 11 may include one or a plurality of preliminary filters. In one example, the preliminary filtration apparatus 11 uses one or a plurality of activated carbon filter elements. The raw water in the raw water pipeline L1 is supplied by a municipal tap water pipeline. However, the present application is not limited to this. In other examples according to the present application, the raw water in the raw water pipeline L1 may also be supplied by a water storage container. In this example, the product water outflow pipeline of the reverse osmosis filtration unit 10 includes a pure water outflow pipeline (a first product water outflow pipeline) L21 and a purified water outflow pipeline (a second product water outflow pipeline) L22. The faucet 30 includes a pure water inlet 31, a purified water inlet 32, and a water outlet 33, and the faucet 30 is operable such that the water outlet 33 is selectively in communication with the pure water inlet 31 and/or the purified water inlet 32. The purified water obtained after filtration by the preliminary filtration apparatus 11 may flow from a three-way joint A1 to the purified water inlet 32 of the faucet 30 through the purified water outflow pipeline L22. When the faucet 30 is turned on such that the purified water inlet 32 is in communication with the water outlet 33, the purified water may flow out through the water outlet 33 for use. In addition, the purified water obtained after filtration by the preliminary filtration apparatus 11 may also flow to the downstream reverse osmosis filtration apparatus for further filtration, thus obtaining pure water without minerals.

The reverse osmosis filtration apparatus includes a switch valve 12, a reverse osmosis membrane filter element 13, a first one-way valve 14, a water storage tank 15, a post-filtration apparatus 16, a second one-way valve 17, a reversing valve 18, a flow restriction apparatus 19, and a drainage apparatus 20.

The switch valve 12 is connected between a water outlet of the preliminary filtration apparatus 11 and a water inlet 131 of the reverse osmosis membrane filter element 13. The switch valve 12 controls the communication between the outlet of the preliminary filtration apparatus 11 and the water inlet 131 of the reverse osmosis membrane filter element 13 according to a pressure in a pure water chamber 151 of the water storage tank 15, for controlling the operation of the reverse osmosis membrane filter element 13. The switch valve 12 may be a mechanical switch valve or an electromagnetic switch valve. The reverse osmosis membrane filter element 13 is configured to further filter out the minerals in the purified water. A pure water outlet 132 of the reverse osmosis membrane filter element 13 is connected to an inlet of the first one-way valve 14, and an outlet of the first one-way valve 14 is connected to a four-way joint A2. The four-way joint A2 is in communication with the outlet of the first one-way valve 14, the pure water chamber 151 of the water storage tank 15, a water inlet of the post-filtration apparatus 16, and the switch valve 12, respectively. The pure water obtained after filtration by the reverse osmosis membrane filter element 13 flows through the first one-way valve 14 from the pure water outlet 132 and flows into the pure water chamber 151 of the water storage tank 15, but the pure water in the pure water chamber 151 cannot flow back to the reverse osmosis membrane filter element 13. The pure water flowing out from the first one-way valve 14 may flow to the post-filtration apparatus 16, such that the pure water is further filtered. The pure water filtered by the post-filtration apparatus 16 flows through the second one-way valve 17, and flows to the pure water inlet 31 of the faucet 30 through the pure water outflow pipeline L21. When the faucet 30 is turned on such that the pure water inlet 31 is in communication with the water outlet 33, the pure water can flow out from the water outlet 33 of the faucet 30 for use. The second one-way valve 17 is configured to prevent the pure water in the pure water outflow pipeline L21 from flowing back to the pure water chamber 151 of the water storage tank 15. In the configuration shown in FIG. 1, the second one-way valve 17 is arranged downstream of the post-filtration apparatus 16. Alternatively, in other examples according to the present application, the second one-way valve 17 may also be arranged upstream of the post-filtration apparatus 16, and located between the four-way joint A2 and the post-filtration apparatus 16. A concentrated water outlet 133 of the reverse osmosis membrane filter element 13 is connected to an inlet of the flow restriction apparatus 19, and an outlet of the flow restriction apparatus 19 is connected to the drainage apparatus 20. Concentrated water flowing out from the concentrated water outlet 133 of the reverse osmosis membrane filter element 13 may flow through the flow restriction apparatus 19 and be discharged by the drainage apparatus 20.

The water storage tank 15 includes the pure water chamber 151 and a pressure chamber 153 that are separated by an impermeable membrane. The volume of the pure water chamber 151 and the volume of the pressure chamber 153 may be changed according to the pressure, but the total volume of the two keeps unchanged. The volume of the pure water chamber 151 decreases as the volume of the pressure chamber 153 increases, or increases as the volume of the pressure chamber 153 decreases. The pure water chamber 151 is used to store pure water obtained after filtration by the reverse osmosis membrane filter element 13, and the pressure chamber 153 is configured to selectively contain the concentrated water flowing out from the concentrated water outlet 133 of the reverse osmosis membrane filter element 13, for adjusting a back pressure of the pure water chamber 151. The reverse osmosis filtration system 100 is configured as a water-to-water reverse osmosis (WOW RO) filtration system.

The reversing valve 18 is a mechanical reversing valve, which can turn on or turn off a corresponding pipeline according to a pressure change of the pure water outflow pipeline L21 of the reverse osmosis filtration unit 10 corresponding to an on/off state of the faucet 30, thus controlling inflow and outflow of the concentrated water in the pressure chamber 153 to assist the operation of the reverse osmosis filtration unit 10. Four pipelines are connected to the reversing valve 18. A first port of the reversing valve 18 is connected to a three-way joint A3 between the concentrated water outlet 133 of the reverse osmosis membrane filter element 13 and the flow restriction apparatus 19 through a first pipeline 181, such that the concentrated water flowing out from the concentrated water outlet 133 of the reverse osmosis membrane filter element 13 can flow to the reversing valve 18 through the first pipeline 181. A second port of the reversing valve 18 is in communication with the pressure chamber 153 of the water storage tank 15 through a second pipeline 182, such that the concentrated water in the pressure chamber 153 can flow from the pressure chamber 153 to the reversing valve 18, and vice versa, thus controlling the volume and pressure of the pressure chamber 153, and further controlling the back pressure of the pure water chamber 151. A third port of the reversing valve 18 is connected to a three-way joint A4 between the flow restriction apparatus 19 and the drainage apparatus 20 through a third pipeline 183. A fourth port of the reversing valve 18 is connected to a three-way joint A5 in the pure water outflow pipeline L21 through a fourth pipeline 184. When the faucet 30 is turned on such that the pure water inlet 31 is in communication with the water outlet 33, the first pipeline 181 is in communication with the second pipeline 182, such that the concentrated water flowing out from the concentrated water outlet 133 of the reverse osmosis membrane filter element 13 flows into the pressure chamber 153 through the first pipeline 181 and the second pipeline 182, thus providing the back pressure to the pure water chamber 151 at an upper portion of the water storage tank 15. The volume of the pressure chamber 153 is increased and the pure water in the pure water chamber 151 is squeezed out, such that the pure water in the pure water chamber 151 can smoothly flow through the post-filtration apparatus 16 and the second one-way valve 17, then flow to the pure water inlet 31 of the faucet 30 through the pure water outflow pipeline L21, and flow out from the water outlet 33 of the faucet 30. When the faucet 30 is turned off, since the switch valve 12 is still turned on at this time, the purified water, after being filtered by the preliminary filtration apparatus 11, still flows into the reverse osmosis membrane filter element 13, and a pressure in the fourth pipeline 184 rises instantaneously. The first pipeline 181 and the second pipeline 182 are no longer in communication with each other, and the second pipeline 182 is in communication with the third pipeline 183. The pure water obtained by filtration of the reverse osmosis membrane filter element 13 flows into the pure water chamber 151, and the pure water in the water storage tank 15 is increased continuously. When squeezed by the pure water in the pure water chamber 151, the concentrated water in the pressure chamber 153 flows to the three-way joint A4 through the second pipeline 182 and the third pipeline 183, and is discharged by the drainage apparatus 20, such that the volume of the pure water chamber 151 is increased continuously. When the water storage tank 15 is full of pure water, the pressure in the pure water chamber 151 reaches the water storage pressure threshold, and a pressure in a control pipeline 121 in communication with the pure water chamber 151 also reaches the water storage pressure threshold. The control pipeline 121 drives the switch valve 12 to be turned off, and the reverse osmosis membrane filter element 13 stops working.

It should be noted here that the reverse osmosis filtration unit 10 in FIG. 1 is only exemplary. The reverse osmosis filtration unit 10 may not include the post-filtration apparatus 16 and/or the flow restriction apparatus 19. Herein, "upstream" and "downstream" are defined according to a flow direction of water in the reverse osmosis filtration system 100.

When the pressure in the raw water pipeline L1 is greater than or equal to the minimum working pressure of the reverse osmosis filtration unit 10, the reverse osmosis filtration unit 10 can work stably, and when the faucet 30 is operated such that the water outlet 33 is in communication with one or both of the purified water inlet 32 and the pure water inlet 31, the water outlet 33 of the faucet 30 enables purified water, pure water, or mixed water of the two to flow out stably. However, when the pressure in the raw water pipeline L1 is less than the minimum working pressure (for example, 25 psi) of the reverse osmosis filtration unit 10, it is difficult for the raw water in the raw water pipeline L1 to flow into the reverse osmosis filtration unit 10. Especially, the purified water, after being filtered by the preliminary filtration apparatus 11, has a pressure insufficient to penetrate the reverse osmosis membrane filter element 13, which affects a water production rate of the reverse osmosis membrane filter element 13, such that the reverse osmosis membrane filter element 13 cannot work stably, or even cannot work. Therefore, water cannot flow stably from the water outlet 33, thus affecting the use of the reverse osmosis filtration system.

Hence, the reverse osmosis filtration system 100 according to the first embodiment of the present application is further provided with a pump unit 50 such that the reverse osmosis filtration system 100 can operate normally even if the pressure in the raw water pipeline L1 is relatively low. As shown in FIG. 1, the pump unit 50 is arranged between the raw water pipeline L1 and the reverse osmosis filtration unit 10. The pump unit 50 is configured such that even if the pressure in the raw water pipeline L1 is small, for example, less than the minimum working pressure of the reverse osmosis membrane filter element 13 of the reverse osmosis filtration unit 10, the raw water in the raw water pipeline L1 can still be pumped to the reverse osmosis filtration unit 10 such that the reverse osmosis filtration unit 10 can work normally.

The pump unit 50 includes a low-pressure control portion 51, a pump 52, a one-way valve 53, a power supply apparatus 54, and a high-pressure control portion 55. The low-pressure control portion 51 is configured to control the pump 52 according to the pressure in the raw water pipeline L1. The high-pressure control portion 55 is configured to control the pump 52 according to the pressure in the product water outflow pipeline (the pure water outflow pipeline L21 and the purified water outflow pipeline L22) of the reverse osmosis filtration unit 10.

In the example shown in FIG. 1, the power supply apparatus 54 supplies power for the pump 52, and the low-pressure control portion 51 and the high-pressure control portion 55 are connected in series in a power supply circuit of the pump 52, as shown by dashed lines in FIG. 1. In FIG. 1, the dashed lines show circuit connections between the various parts, and solid lines show pipeline connections between the various parts.

The low-pressure control portion 51 uses a low-pressure protection pressure switch. As shown in FIG. 1, a fluid inlet of the low-pressure control portion 51 is connected to a pipeline between a three-way joint B1 of the raw water pipeline L1 and an inlet of the pump 52, and the low-pressure control portion 51 is electrically connected in series between the power supply apparatus 54 and the high-pressure control portion 55. The low-pressure control portion 51 is configured to turn on or turn off an electrical connection between the power supply apparatus 54 and the high-pressure control portion 55 according to the pressure in the raw water pipeline L1. When the pressure in the raw water pipeline L1 is greater than or equal to a raw water pressure threshold, the low-pressure control portion 51 is turned on, thereby turning on the electrical connection between the power supply apparatus 54 and the high-pressure control portion 55. An outlet of the pump 52 is connected to a three-way joint B2, and the pump 52 is configured to selectively pump the raw water in the raw water pipeline L1 to the three-way joint B2, for transporting the raw water to the reverse osmosis filtration unit 10 through a pipeline L12. Once the pressure in the raw water pipeline L1 is less than the raw water pressure threshold, for example, when there is no raw water in the raw water pipeline L1, the low-pressure control portion 51 is turned off, thereby turning off the electrical connection between the power supply apparatus 54 and the high-pressure control portion 55. Therefore, the power supply circuit of the pump 52 is turned off and the pump 52 does not work, thereby preventing the pump 52 from idling when the raw water pipeline L1 has insufficient raw water or no raw water. The raw water pressure threshold may be a zero pressure. The reverse osmosis filtration system 100 may also be provided with a prompt apparatus (not shown), and the prompt apparatus may be configured to generate prompt information when there is no raw water in the raw water pipeline L1. Preferably, a filter may be arranged between the three-way joint B1 and the low-pressure control portion 51 to filter out particulate impurities in the raw water, for preventing the particulate impurities in the raw water from entering the low-pressure control portion 51 and the pump 52 to cause blockage.

The high-pressure control portion 55 is electrically connected in series between the low-pressure control portion 51 and the pump 52, and is configured to turn on or turn off the electrical connection between the low-pressure control portion 51 and the pump 52 according to the pressures in the pure water outflow pipeline L21 and/or the purified water outflow pipeline L22 of the reverse osmosis filtration unit 10. In the example shown in FIG. 1, the high-pressure control portion 55 includes a first high-pressure protection pressure switch 56 and a second high-pressure protection pressure switch 57, and the first high-pressure protection pressure switch 56 and the second high-pressure protection pressure switch 57 are connected in parallel.

A fluid inlet of the first high-pressure protection pressure switch 56 is connected to the pure water outflow pipeline L21 of the reverse osmosis filtration unit 10, and the first high-pressure protection pressure switch 56 is electrically connected in series between the low-pressure control portion 51 and the pump 52. The first high-pressure protection pressure switch 56 is configured to turn on or turn off the electrical connection between the low-pressure control portion 51 and the pump 52 via the first high-pressure protection pressure switch 56 according to the pressure in the pure water outflow pipeline L21. If the pressure in the pure water outflow pipeline L21 is greater than or equal to a first pressure threshold, the first high-pressure protection pressure switch 56 is turned off, and the electrical connection between the low-pressure control portion 51 and the pump 52 via the first high-pressure protection pressure switch 56 is turned off. If the pressure in the pure water outflow pipeline L21 is less than the first pressure threshold, the first high-pressure protection pressure switch 56 is turned on, and the electrical connection between the low-pressure control portion 51 and the pump 52 via the first high-pressure protection pressure switch 56 is turned on. In this example, the first pressure threshold is a water storage pressure threshold of the water storage tank 15. If the pressure in the pure water outflow pipeline L21 reaches the water storage pressure threshold of the water storage tank 15, it means that the water storage tank 15 is full of pure water, so the first high-pressure protection pressure switch 56 is turned off, and the electrical connection between the low-pressure control portion 51 and the pump 52 via the first high-pressure protection pressure switch 56 is turned off. If the pressure in the pure water outflow pipeline L21 is less than the water storage pressure threshold of the water storage tank 15, it means that the water storage tank 15 can store more pure water, and the reverse osmosis membrane filter element 13 can continue to produce water, so the first high-pressure protection pressure switch 56 is turned on, and the electrical connection between the low-pressure control portion 51 and the pump 52 via the first high-pressure protection pressure switch 56 is turned on.

A fluid inlet of the second high-pressure protection pressure switch 57 is connected to the purified water outflow pipeline L22 of the reverse osmosis filtration unit 10, and the second high-pressure protection pressure switch 57 and the first high-pressure protection pressure switch 56 are electrically connected in parallel between the low-pressure control portion 51 and the pump 52. The second high-pressure protection pressure switch 57 is configured to turn on or turn off the electrical connection between the low-pressure control portion 51 and the pump 52 via the second high-pressure protection pressure switch 57 according to the pressure in the purified water outflow pipeline L22. If the pressure in the purified water outflow pipeline L22 is greater than or equal to a second pressure threshold, the second high-pressure protection pressure switch 57 is turned off, and the electrical connection between the low-pressure control portion 51 and the pump 52 via the second high-pressure protection pressure switch 57 is turned off. If the pressure in the purified water outflow pipeline L22 is less than the second pressure threshold, the second high-pressure protection pressure switch 57 is turned on, and the electrical connection between the low-pressure control portion 51 and the pump 52 via the second high-pressure protection pressure switch 57 is turned on. In this example, the second pressure threshold is a purified water pressure threshold of the purified water outflow pipeline L22.

When the low-pressure control portion 51 turns on the electrical connection between the power supply apparatus 54 and the high-pressure control portion 55, if either or both of the first high-pressure protection pressure switch 56 and the second high-pressure protection pressure switch 57 are turned on, the power supply circuit of the pump 52 is turned on, and the pump 52 works to pump the raw water in the raw water pipeline L1 to the reverse osmosis filtration unit 10. If the first high-pressure protection pressure switch 56 and the second high-pressure protection pressure switch 57 are both turned off, the electrical connection between the low-pressure control portion 51 and the pump 52 is turned off, the power supply circuit of the pump 52 is thus turned off, and the pump 52 does not work. In addition, once the low-pressure control portion 51 turns off the electrical connection between the power supply apparatus 54 and the high-pressure control portion 55, the power supply circuit of the pump 52 is turned off, and the pump 52 does not work, for preventing the pump 52 from idling when the raw water pipeline L1 has insufficient raw water or no raw water.

The pump unit 50 is also provided with a bypass pipeline L11. The bypass pipeline L11 connects the three-way joint B1 and the three-way joint B2 to each other. As described above, a part of the raw water in the raw water pipeline L1 can be pumped to the three-way joint B2 by the pump 52, and flow into the preliminary filtration apparatus 11 of the reverse osmosis filtration unit 10 through the pipeline L12. In addition, the other part of the raw water in the raw water pipeline L1 does not flow through the pump 52, but flows from the three-way joint B1 to the three-way joint B2 through the bypass pipeline L11, and flows into the preliminary filtration apparatus 11 of the reverse osmosis filtration unit 10 through the pipeline L12. By arranging the bypass pipeline L11 that bypasses the pump 52, the raw water can still flow to the reverse osmosis filtration unit 10 through the bypass pipeline L11. Therefore, the pump 52 may use a pump with a lower power, such that the noise and vibration can be reduced, and the cost can be reduced.

The one-way valve 53 is a low-pressure one-way valve configured to prevent the raw water flowing into the reverse osmosis filtration unit 10 from flowing back to the raw water pipeline L1. In the example shown in FIG. 1, the one-way valve 53 is arranged in the bypass pipeline L11. However, the present application is not limited to this. In other examples according to the present application, the one-way valve 53 may also be arranged in the pipeline L12.

By arranging the above high-pressure control portion 55, a working state of the reverse osmosis filtration unit 10 can be determined according to the pressures in the pure water outflow pipeline L21 and the purified water outflow pipeline L22 of the reverse osmosis filtration unit 10 respectively, thus realizing on-demand water supply for the reverse osmosis filtration unit 10. Therefore, the reverse osmosis filtration system 100 can operate stably even when the pressure of the raw water pipeline L1 is low, and the operation stability of the reverse osmosis filtration system 100 is improved.

The pipeline connections and circuit connections of the reverse osmosis filtration system 100 according to the first embodiment of the present application have been described above. The operation process of the reverse osmosis filtration system 100 according to the first embodiment of the present application will be described below with reference to FIG. 1.

When the faucet 30 is turned on such that the water outlet 33 is in communication with the pure water inlet 31 and then in communication with the pure water outflow pipeline L21, the pressure in the pure water outflow pipeline L21 is reduced, and the pure water in the pure water chamber 151 of the water storage tank 15 flows to the water outlet 33 of the faucet 30 through the pure water outflow pipeline L21. At this time, the pressure in the pure water outflow pipeline L21 is less than the water storage pressure threshold of the water storage tank 15, the first high-pressure protection pressure switch 56 is turned on, and the electrical connection between the low-pressure control portion 51 and the pump 52 via the first high-pressure protection pressure switch 56 is turned on. At this time, if the pressure in the raw water pipeline L1 is greater than or equal to the raw water pressure threshold, the low-pressure control portion 51 turns on the electrical connection between the power supply apparatus 54 and the high-pressure control portion 55, and therefore, the power supply circuit of the pump 52 is turned on, and the pump 52 works to pump the raw water in the raw water pipeline L1 to the reverse osmosis filtration unit 10. When the faucet 30 is turned on such that the water outlet 33 is in communication with the purified water inlet 32 and then in communication with the purified water outflow pipeline L22, the pressure in the purified water outflow pipeline L22 is reduced, and the purified water, after being filtered by the preliminary filtration apparatus 11, flows to the water outlet 33 of the faucet 30 through the purified water outflow pipeline L22. At this time, the pressure in the purified water outflow pipeline L22 is less than the purified water pressure threshold, the second high-pressure protection pressure switch 57 is turned on, and the electrical connection between the low-pressure control portion 51 and the pump 52 via the second high-pressure protection pressure switch 57 is turned on. At this time, if the low-pressure control portion 51 turns on the electrical connection between the power supply apparatus 54 and the high-pressure control portion 55, the power supply circuit of the pump 52 is turned on, and the pump 52 works to pump the raw water in the raw water pipeline L1 to the reverse osmosis filtration unit 10.

When the faucet 30 is turned off such that the water outlet 33 is not in communication with the pure water inlet 31 and the purified water inlet 32, if the pressure in the pure water outflow pipeline L21 is less than the water storage pressure threshold, the reverse osmosis membrane filter element 13 can continue to produce water and the produced pure water is stored in the pure water chamber 151 of the water storage tank 15, so the first high-pressure protection pressure switch 56 is turned on. At this time, if the pressure in the raw water pipeline L1 is greater than or equal to the raw water pressure threshold, the pump 52 works to pump the raw water in the raw water pipeline L1 to the reverse osmosis filtration unit 10. Once the pressure in the pure water outflow pipeline L21 reaches the water storage pressure threshold, the water storage tank 15 is full of pure water, and the reverse osmosis membrane filter element 13 does not need to continue to produce water, so the first high-pressure protection pressure switch 56 is turned off. If the pressure in the purified water outflow pipeline L22 is less than the purified water pressure threshold, the second high-pressure protection pressure switch 57 is turned on. At this time, if the pressure in the raw water pipeline L1 is greater than or equal to the raw water pressure threshold, the pump 52 works to pump the raw water in the raw water pipeline L1 to the reverse osmosis filtration unit 10. Once the pressure in the purified water outflow pipeline L22 reaches the purified water pressure threshold, the second high-pressure protection pressure switch 57 is turned off. If the pressure in the pure water outflow pipeline L21 reaches the water storage pressure threshold and the pressure in the purified water outflow pipeline L22 reaches the purified water pressure threshold, there is no need to use the pump 52 to pump the raw water in the raw water pipeline L1 to the reverse osmosis filtration unit 10. Therefore, the first high-pressure protection pressure switch 56 and the second high-pressure protection pressure switch 57 are both turned off, the power supply circuit of the pump 52 is thus turned off, and the pump 52 does not work.

The reverse osmosis filtration system 100 according to the first embodiment of the present application has been described above. In the reverse osmosis filtration system 100 according to the first embodiment of the present application, by adding an external pump unit 50 to the reverse osmosis filtration unit 10, the reverse osmosis filtration system 100 is enabled to work stably even if the pressure in the raw water pipeline L1 is small (for example, less than 25 psi). Moreover, by arranging the bypass pipeline L11 in the pump unit 50, the pump 52 is allowed to use a pump with a lower power, such that the noise and vibration generated by the pump 52 in the working process can be reduced, and the cost can be reduced. By controlling the pump 52 according to the pressures of the pure water outflow pipeline L21 and the purified water outflow pipeline L22 of the reverse osmosis filtration unit 10 respectively, the working state of the reverse osmosis filtration unit 10 can be accurately determined to realize on-demand water supply.

In the reverse osmosis filtration system 100 shown in FIG. 1, the pressure chamber 153 of the water storage tank 15 contains the concentrated water, and the reverse osmosis filtration system 100 is configured as a water-to-water reverse osmosis filtration system. However, the present application is not limited thereto. The conception of the present application may also be applied to an air-to-water reverse osmosis filtration system and other types of filtration systems to improve the operation stability of the filtration system.

Figure 2:
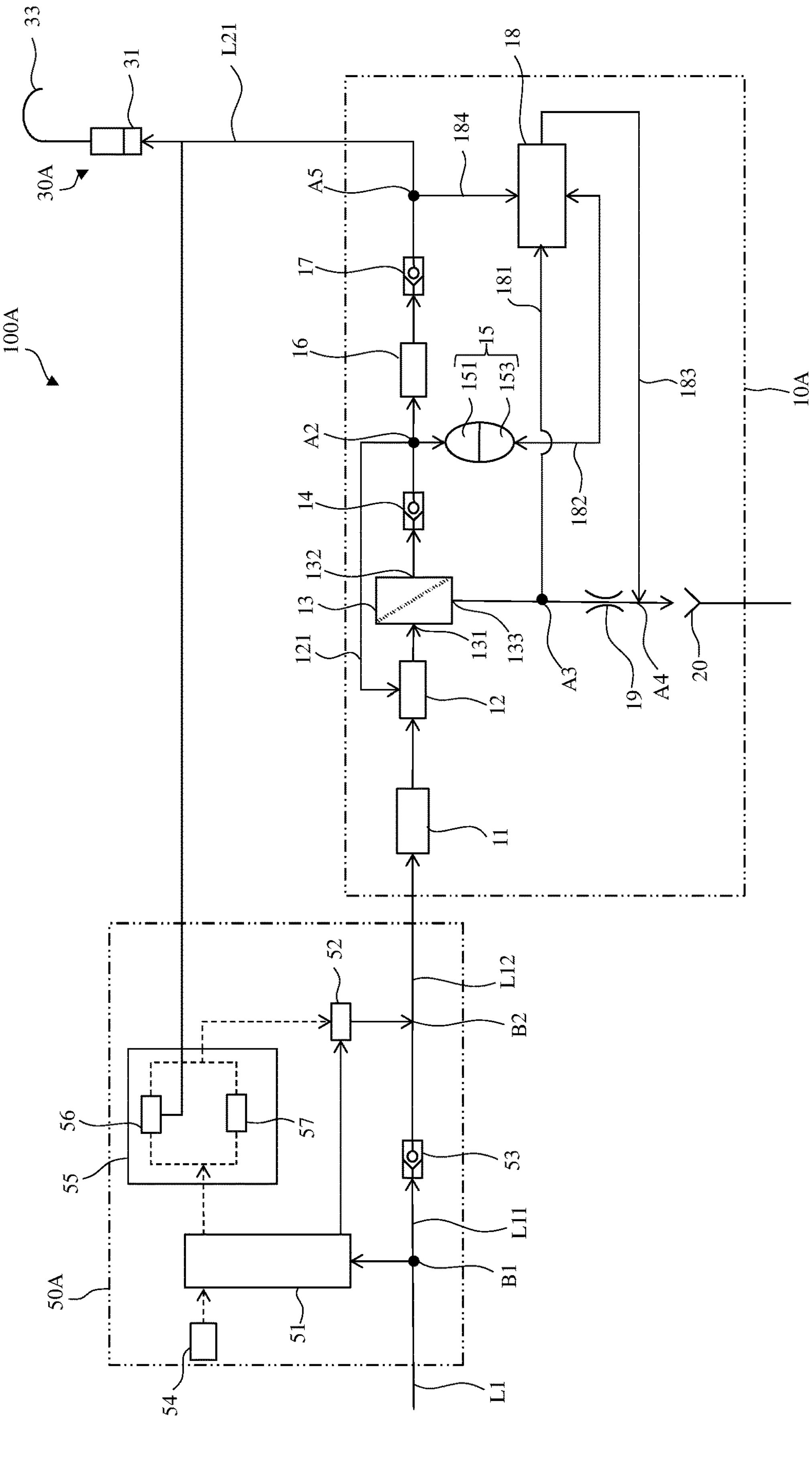
FIG. 2 shows a schematic block diagram of a reverse osmosis filtration system according to a second embodiment of the present application.

FIG. 2 shows a schematic block diagram of a reverse osmosis filtration system 100A according to a second embodiment of the present application. The reverse osmosis filtration system 100A according to the second embodiment of the present application has substantially the same configuration as the reverse osmosis filtration system 100 according to the first embodiment of the present application, except for structures of the outlet pipeline of the reverse osmosis filtration unit and the faucet only. Therefore, in the accompanying drawings and the following, the same components are represented by the same reference numerals, and the corresponding descriptions are omitted. The differences between the reverse osmosis filtration system 100A and the reverse osmosis filtration system 100 will be mainly described below.

As shown in FIG. 2, the reverse osmosis filtration system 100A includes a reverse osmosis filtration unit 10A, a faucet 30A, and a pump unit 50A. The pump unit 50A has the same configuration as the pump unit 50 shown in FIG. 1. The reverse osmosis filtration unit 10A and the faucet 30A have substantially the same configurations as the filtration unit 10 and the faucet 30 shown in FIG. 1, respectively, except that the reverse osmosis filtration unit 10A is provided with the pure water outflow pipeline (the first product water outflow pipeline) L21 only and is not provided with the purified water outflow pipeline (the second product water outflow pipeline) L22, and accordingly, the faucet 30A is provided with one water inlet only, that is, the pure water inlet 31. Alternatively, the faucet 30 shown in FIG. 1 may also be used in the reverse osmosis filtration system 100A. When the faucet 30 is connected to the reverse osmosis filtration unit 10A, the pure water inlet 31 of the faucet 30 is connected to the pure water outflow pipeline L21 of the reverse osmosis filtration unit 10A, and the purified water inlet 32 of the faucet 30 is blocked.

In the reverse osmosis filtration system 100A, the fluid inlet of the first high-pressure protection pressure switch 56 of the high-pressure control portion 55 of the pump unit 50A is connected to the pure water outflow pipeline L21 of the reverse osmosis filtration unit 10A, the first high-pressure protection pressure switch 56 is electrically connected in series between the low-pressure control portion 51 and the pump 52, the second high-pressure protection pressure switch 57 is not connected to the pipeline of the reverse osmosis filtration unit 10A, and therefore the second high-pressure protection pressure switch 57 is always in an off state.

The reverse osmosis filtration unit 10A in FIG. 2 is only exemplary. The reverse osmosis filtration unit 10A may not include one or a plurality of a pre-filtration apparatus 11, the post-filtration apparatus 16, and the flow restriction apparatus 19.

When the faucet 30A is turned on such that the pure water inlet 31 is in communication with the water outlet 33, the pressure in the pure water outflow pipeline L21 is reduced, and the pure water produced by the reverse osmosis filtration unit 10A flows to the pure water inlet 31 of the faucet 30A through the pure water outflow pipeline L21, and flows out from the water outlet 33 for use. At this time, the pressure in the pure water outflow pipeline L21 is less than the water storage pressure threshold, so the first high-pressure protection pressure switch 56 is turned on, and the electrical connection between the low-pressure control portion 51 and the pump 52 via the first high-pressure protection pressure switch 56 is turned on. At this time, if the pressure in the raw water pipeline L1 is greater than or equal to the raw water pressure threshold, the low-pressure control portion 51 turns on the electrical connection between the power supply apparatus 54 and the high-pressure control portion 55; therefore, the power supply circuit of the pump 52 is turned on, and the pump 52 works to pump the raw water in the raw water pipeline L1 to the reverse osmosis filtration unit 10A.

When the faucet 30A is turned off such that the pure water inlet 31 is not in communication with the water outlet 33, if the pressure in the pure water outflow pipeline L21 is less than the water storage pressure threshold, the reverse osmosis membrane filter element 13 can continue to produce water and the produced pure water is stored in the pure water chamber 151 of the water storage tank 15. Therefore, the first high-pressure protection pressure switch 56 is turned on, and the electrical connection between the low-pressure control portion 51 and the pump 52 via the first high-pressure protection pressure switch 56 is turned on. At this time, if the pressure in the raw water pipeline L1 is greater than or equal to the raw water pressure threshold, the low-pressure control portion 51 turns on the electrical connection between the power supply apparatus 54 and the high-pressure control portion 55, the power supply circuit of the pump 52 is thus turned on, and the pump 52 works to pump the raw water in the raw water pipeline L1 to the reverse osmosis filtration unit 10A. Once the pressure in the pure water outflow pipeline L21 reaches the water storage pressure threshold, there is no need to use the pump 52 to pump the raw water for the reverse osmosis filtration unit 10A, so the first high-pressure protection pressure switch 56 is turned off, the power supply circuit of the pump 52 is thus turned off, and the pump 52 does not work.

The reverse osmosis filtration system 100A according to the second embodiment of the present application can achieve beneficial technical effects similar to those of the reverse osmosis filtration system 100 according to the first embodiment of the present application.

Figure 3:
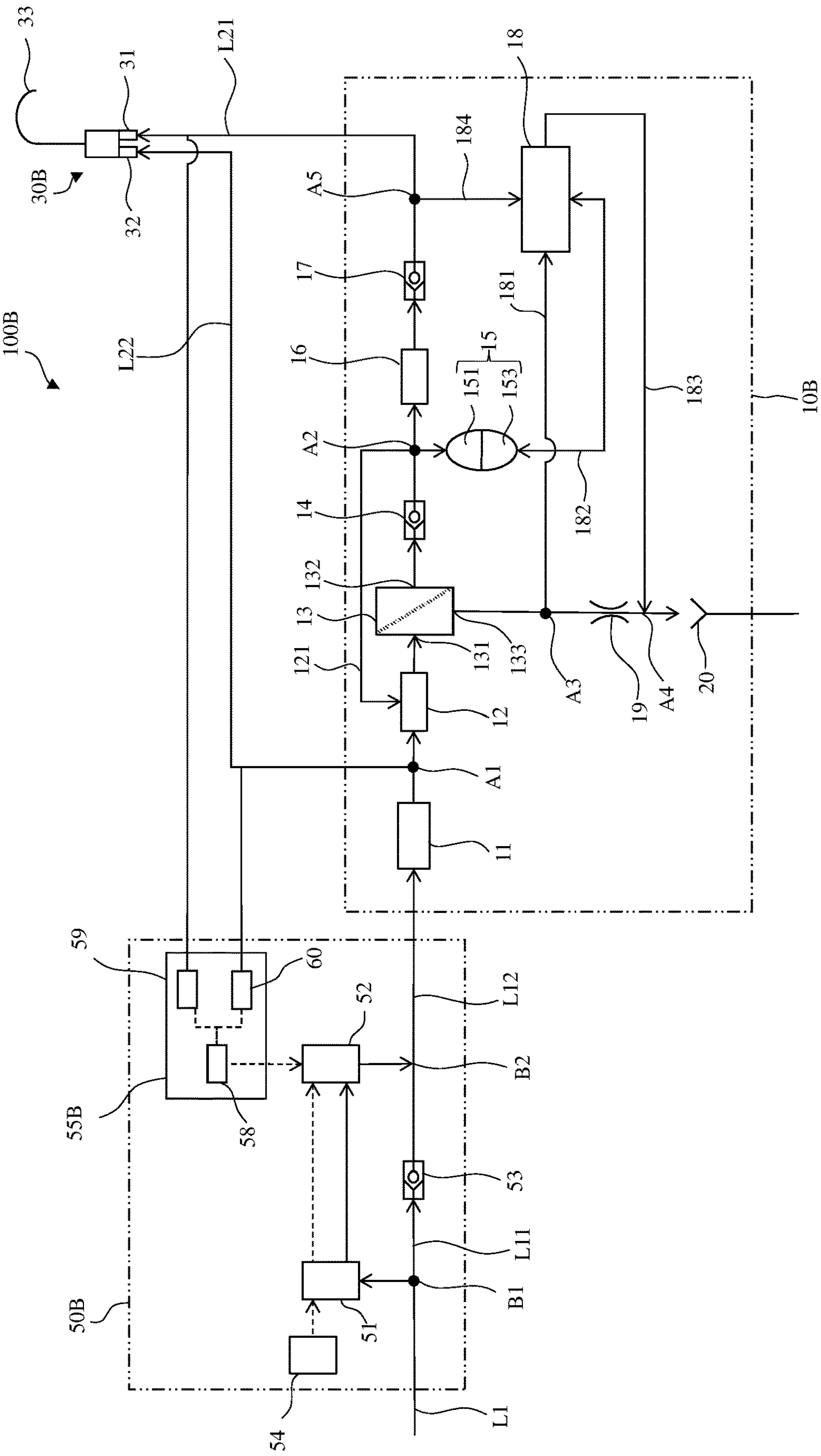
FIG. 3 shows a schematic block diagram of a reverse osmosis filtration system according to a third embodiment of the present application.

FIG. 3 shows a schematic block diagram of a reverse osmosis filtration system 100B according to a third embodiment of the present application. The reverse osmosis filtration system 100B according to the third embodiment of the present application has substantially the same configuration as the reverse osmosis filtration system 100 according to the first embodiment of the present application, except for the configuration of the pump unit only. Therefore, in the accompanying drawings and the following, the same components are represented by the same reference numerals, and the corresponding descriptions are omitted. The differences between the reverse osmosis filtration system 100B and the reverse osmosis filtration system 100 will be mainly described below.

As shown in FIG. 3, the reverse osmosis filtration system 100B includes a reverse osmosis filtration unit 10B, a faucet 30B, and a pump unit 50B. The reverse osmosis filtration unit 10B and the faucet 30B have the same configurations as the reverse osmosis filtration unit 10 and the faucet 30 shown in FIG. 1, respectively. The configuration of the pump unit 50B is substantially the same as that of the pump unit 50 shown in FIG. 1, except for the configuration of the high-pressure control portion only.

A high-pressure control portion 55B of the pump unit 50B is electrically connected to the pump 52, and configured to control the pump 52 according to pressures in the pure water outflow pipeline L21 and/or the purified water outflow pipeline L22 of the reverse osmosis filtration unit 10B. In the example shown in FIG. 3, the high-pressure control portion 55B includes a controller 58, a first pressure sensing element 59, and a second pressure sensing element 60. The first pressure sensing element 59 is arranged to detect the pressure in the pure water outflow pipeline L21 of the reverse osmosis filtration unit 10B, and the second pressure sensing element 60 is arranged to detect the pressure in the purified water outflow pipeline L22 of the reverse osmosis filtration unit 10B. The controller 58 is electrically connected to the pump 52, and configured to receive a first pressure signal from the first pressure sensing element 59 and a second pressure signal from the second pressure sensing element 60, and control the pump 52 according to the received pressure signals. When the pressure in the pure water outflow pipeline L21 is greater than or equal to a first pressure threshold (for example, the water storage pressure threshold of the water storage tank 15) and the pressure in the purified water outflow pipeline L22 is greater than or equal to a second pressure threshold, the controller 58 controls the pump 52 such that the pump 52 does not work. When the pressure in the pure water outflow pipeline L21 is less than the first pressure threshold (for example, the water storage pressure threshold of the water storage tank 15) and/or the pressure in the purified water outflow pipeline L22 is less than the second pressure threshold, the controller 58 allows the pump 52 to work when it is powered.

The first pressure signal and/or the second pressure signal received by the controller 58 may be a measured pressure value or a switching value signal. In an example, the first sensing element 59 and the second sensing element 60 may be sensors, the first pressure signal and the second pressure signal received by the controller 58 are pressure values measured by the sensors, and the controller 58 is configured to compare the received pressure values respectively with the corresponding pressure thresholds, and control the pump 52 accordingly. In another example, the first sensing element 59 and the second sensing element 60 may be high-pressure protection pressure switches similar to the first high-pressure protection pressure switch and the second high-pressure protection pressure switch in FIG. 1. When the sensed pressure is greater than or equal to the corresponding pressure threshold, the high-pressure protection pressure switch is turned off, and when the sensed pressure is less than the corresponding pressure threshold, the high-pressure protection pressure switch is turned on. In this example, the first pressure signal and the second pressure signal received by the controller 58 are on/off state signals of the high-pressure protection pressure switch, and the pump 52 is controlled accordingly.

The power supply apparatus 54 supplies power to the pump 52. The low-pressure control portion 51 is electrically connected in series between the power supply apparatus 54 and the pump 52, and configured to turn on or turn off the electrical connection between the power supply apparatus 54 and the pump 52 according to the pressure in the raw water pipeline L1. When the pressure in the raw water pipeline L1 is greater than or equal to the raw water pressure threshold, the low-pressure control portion 51 turns on the electrical connection between the power supply apparatus 54 and the pump 52. At this time, if the pressure in the pure water outflow pipeline L21 is less than the first pressure threshold (for example, the water storage pressure threshold of the water storage tank 15) and/or the pressure in the purified water outflow pipeline L22 is less than the second pressure threshold, the pump 52 works to pump the raw water in the raw water pipeline L1 to the reverse osmosis filtration unit JOB. When the pressure in the raw water pipeline L1 is less than the raw water pressure threshold, the low-pressure control portion 51 turns off the electrical connection between the power supply apparatus 54 and the pump 52. At this time, regardless of the working state of the reverse osmosis filtration unit JOB, the pump 52 does not work, thus preventing the pump 52 from idling when the raw water pipeline L1 has insufficient raw water or no raw water.

Preferably, the power supply apparatus 54 may also supply power to the controller 58.

The reverse osmosis filtration system 100B according to the third embodiment of the present application can achieve beneficial technical effects similar to those of the reverse osmosis filtration system 100 according to the first embodiment of the present application.

Figure 4:
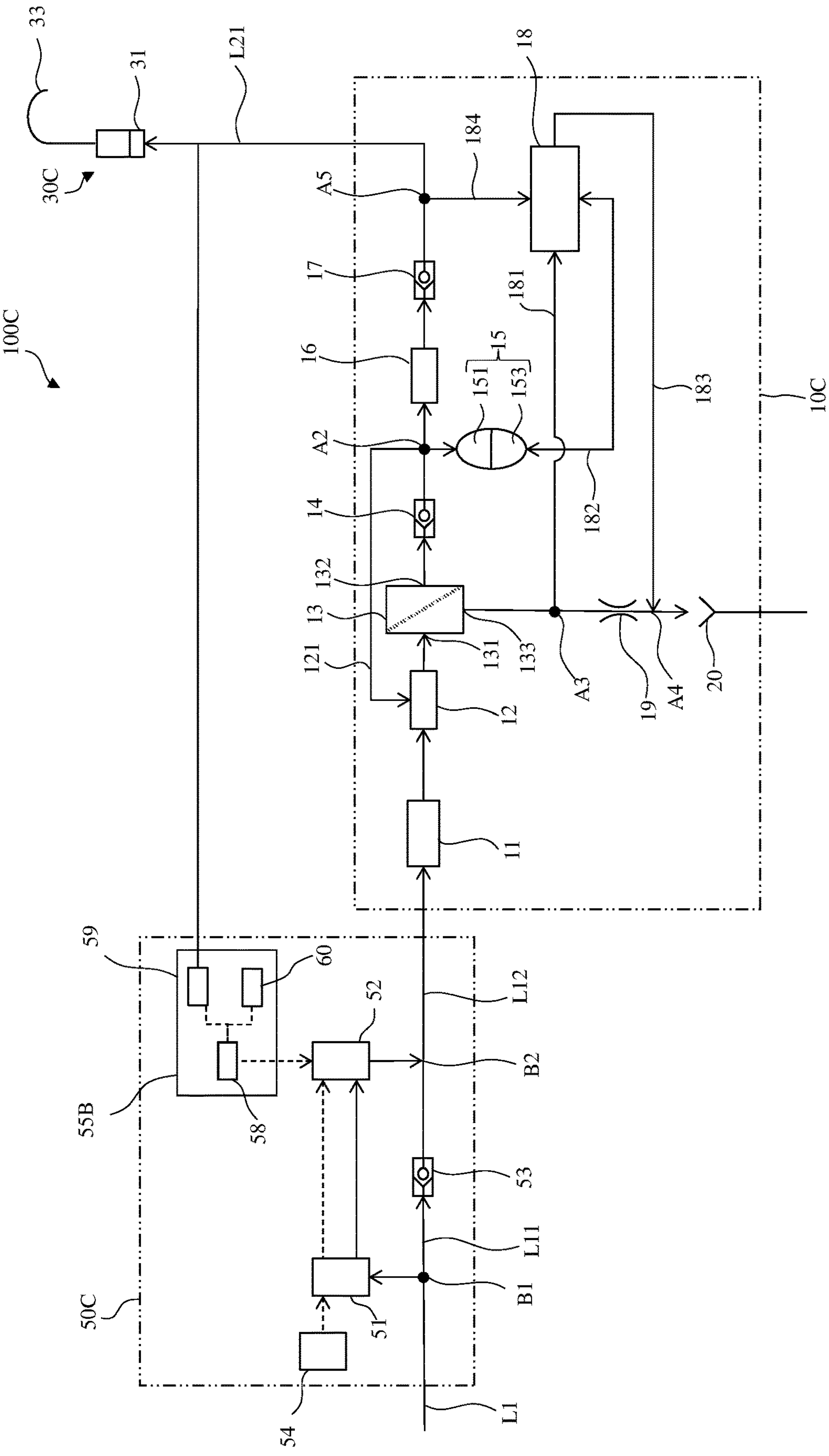
FIG. 4 shows a schematic block diagram of a reverse osmosis filtration system according to a fourth embodiment of the present application.

FIG. 4 shows a schematic block diagram of a reverse osmosis filtration system 100C according to a fourth embodiment of the present application. The reverse osmosis filtration system 100C according to the fourth embodiment of the present application has substantially the same configuration as the reverse osmosis filtration system 100B according to the third embodiment of the present application, except for structures of the outlet pipeline of the reverse osmosis filtration unit and the faucet only. Therefore, in the accompanying drawings and the following, the same components are represented by the same reference numerals, and the corresponding descriptions are omitted. The differences between the reverse osmosis filtration system 100C and the reverse osmosis filtration system 100B will be mainly described below.

As shown in FIG. 4, the reverse osmosis filtration system 100C includes a reverse osmosis filtration unit 10C, a faucet 30C, and a pump unit 50C. The pump unit 50C has the same configuration as the pump unit 50B shown in FIG. 3. The reverse osmosis filtration unit 10C and the faucet 30C have substantially the same configurations as the filtration unit 10B and the faucet 30B shown in FIG. 3, respectively, except that the reverse osmosis filtration unit 10C is provided with the pure water outflow pipeline (the first product water outflow pipeline) L21 only and is not provided with the purified water outflow pipeline (the second product water outflow pipeline) L22, and accordingly, the faucet 30C is provided with one water inlet only, that is, the pure water inlet 31. The reverse osmosis filtration unit 10C and the faucet 30C have the same configurations as the reverse osmosis filtration unit 10A and the faucet 30A shown in FIG. 2.

In the reverse osmosis filtration system 100C, the first sensing element 59 of the high-pressure control portion 55B of the pump unit 50C is connected to the pure water outflow pipeline L21 of the reverse osmosis filtration unit 10C, for sensing the pressure in the pure water outflow pipeline L21, and sending a sensing result to the controller 58. The second sensing element 60 is not used.

When the pressure in the pure water outflow pipeline L21 is greater than or equal to the first pressure threshold (for example, the water storage pressure threshold of the water storage tank 15), the controller 58 controls the pump 52 such that the pump 52 does not work. When the pressure in the raw water pipeline L1 is greater than or equal to the raw water pressure threshold, the low-pressure control portion 51 turns on the electrical connection between the power supply apparatus 54 and the pump 52. At this time, if the pressure in the pure water outflow pipeline L21 is less than the first pressure threshold, the pump 52 works to pump the raw water in the raw water pipeline L1 to the reverse osmosis filtration unit 10C.

The reverse osmosis filtration system 100C according to the fourth embodiment of the present application can achieve beneficial technical effects similar to those of reverse osmosis filtration systems according to other embodiments of the present application.

The above applications of the present application in municipal tap water filtration show the reverse osmosis filtration system according to the preferred embodiments of the present application. However, the present application is not limited to the above preferred embodiments. Modifications can be made to the above preferred embodiments on the basis of the ideas of the present application, and these modifications all fall within the scope of the present application.

In the above preferred embodiments, the low-pressure control portion and the high-pressure control portion are respectively configured to enable or disable the pump 52 according to the pressure of the raw water pipeline L1 and the pressures of the pure water outflow pipeline and the purified water outflow pipeline of the reverse osmosis filtration unit. In other embodiments according to the present application, the pump 52 may be a speed-variable pump, and the low-pressure control portion and the high-pressure control portion may be configured to control a rotational speed of the pump 52 according to the pressures of the pure water outflow pipeline and the purified water outflow pipeline of the reverse osmosis filtration unit. For example, in one example, when the pressure of the pure water outflow pipeline of the reverse osmosis filtration unit is less than the first pressure threshold, the pump 52 is controlled to work at a first rotational speed when power is supplied, such that the raw water flowing out from the outlet of the pump 52 has a first pressure. When the pressure of the pure water outflow pipeline is greater than or equal to the first pressure threshold, and the pressure of the purified water outflow pipeline is less than the second pressure threshold, the pump 52 is controlled to work at a second rotational speed when power is supplied, such that the raw water flowing from the outlet of the pump 52 has a second pressure. The second pressure is less than the first pressure. On the basis of the above arrangement, on-demand water supply can be realized more accurately.

In the above preferred embodiments, the low-pressure control portion uses a low-pressure protection pressure switch. However, the present application is not limited thereto. In other embodiments according to the present application, the low-pressure control portion may also use other suitable configurations. For example, in one example, the low-pressure control portion may also use a combined configuration of a controller and a pressure sensing element.

In the above preferred embodiments, the product water outflow pipeline of the reverse osmosis filtration unit includes the pure water outflow pipeline and the purified water outflow pipeline, and the high-pressure control portion of the pump unit is configured to control the pump according to the pressures of the pure water outflow pipeline and the purified water outflow pipeline. However, the present application is not limited to this. In other examples according to the present application, the reverse osmosis filtration unit may further include other product water outflow pipelines, and the pump unit may be arranged correspondingly according to the configuration of the product water outflow pipeline of the reverse osmosis filtration unit.

Here, the exemplary embodiments of the present application have been described in detail with reference to the applications of the reverse osmosis filtration system according to the present application in the municipal tap water filtration. However, it should be understood that the present application is not limited to the above detailed description and the specific embodiments shown. Those skilled in the art can make various variations and variants of the present application without departing from the gist and scope of the present application. All these variations and variants fall within the scope of the present application. In addition, all members described herein can be replaced with other technically equivalent members.

The invention claimed is:

1. A reverse osmosis filtration system, comprising:

a raw water pipeline;

a reverse osmosis filtration unit configured to filter raw water supplied by the raw water pipeline; and a faucet installed to the reverse osmosis filtration unit wherein the faucet is operable such that a water outlet of the faucet is selectively in communication with a product water outflow pipeline of the reverse osmosis filtration unit;

characterized in that:

the reverse osmosis filtration system further comprises a pump unit arranged between the raw water pipeline and the reverse osmosis filtration unit, wherein the pump unit is configured to selectively pump the raw water in the raw water pipeline to the reverse osmosis filtration unit according to a pressure in the product water outflow pipeline;

wherein the pump unit comprises a pump and a bypass pipeline, wherein, the pump is connected between the raw water pipeline and the reverse osmosis filtration unit; and the bypass pipeline is arranged in parallel with the pump and fluidly connects the raw water pipeline to the reverse osmosis filtration unit, such that raw water is selectively supplied to the reverse osmosis filtration unit through the bypass pipeline without passing through the pump when the pump is inactive;

the reverse osmosis filtration unit comprises a reverse osmosis filtration apparatus and a preliminary filtration apparatus located upstream of the reverse osmosis filtration apparatus;

the product water outflow pipeline comprises a first product water outflow pipeline and a second product water outflow pipeline;

the first product water outflow pipeline is a pure water outflow pipeline of the reverse osmosis filtration apparatus; and the second product water outflow pipeline is a purified water outflow pipeline of the preliminary filtration apparatus;

wherein the raw water, after being filtered by the preliminary filtration apparatus can (i) flow to the faucet, after passing through the reverse osmosis filtration apparatus, through the pure water outflow pipeline; or (ii) flow to the faucet, without passing through the reverse osmosis filtration apparatus, through the purified water outflow pipeline.

2. The reverse osmosis filtration system according to claim 1, wherein the pump unit further comprises:

a low-pressure control portion configured to control the pump according to a pressure in the raw water pipeline, wherein when the pressure in the raw water pipeline is less than a raw water pressure threshold, the low-pressure control portion disables the pump; and a high-pressure control portion configured to control the pump according to the pressure in the product water outflow pipeline, wherein when the pressure in the product water outflow pipeline is greater than or equal to a product water pressure threshold, the high-pressure control portion disables the pump, wherein when the pressure in the raw water pipeline is greater than or equal to the raw water pressure threshold, and the pressure in the product water outflow pipeline is less than the product water pressure threshold, the pump works to pump the raw water in the raw water pipeline to the reverse osmosis filtration unit.

3. The reverse osmosis filtration system according to claim 2, wherein the pump unit further comprises a power supply apparatus arranged to supply power to the pump, wherein when the pressure in the raw water pipeline is less than the raw water pressure threshold, the low-pressure control portion turns off an electrical connection between the power supply apparatus and the pump.

4. The reverse osmosis filtration system according to claim 3, wherein the high-pressure control portion is electrically connected in series between the power supply apparatus and the pump, and is configured to be turned on or turned off selectively according to the pressure in the product water outflow pipeline.

5. The reverse osmosis filtration system according to claim 4, wherein the faucet is operable such that the water outlet is selectively in communication with the first product water outflow pipeline;

the high-pressure control portion comprises a first high-pressure protection pressure switch electrically connected in series between the power supply apparatus and the pump, and a fluid inlet of the first high-pressure protection pressure switch is connected to the first product water outflow pipeline; and the first high-pressure protection pressure switch is configured such that: when a pressure in the first product water outflow pipeline is less than a first pressure threshold, the first high-pressure protection pressure switch is turned on; and when the pressure in the first product water outflow pipeline is greater than or equal to the first pressure threshold, the first high-pressure protection pressure switch is turned off.

6. The reverse osmosis filtration system according to claim 5, wherein the faucet is operable such that the water outlet is selectively in communication with one or both of the first product water outflow pipeline and the second product water outflow pipeline;

the high-pressure control portion further comprises a second high-pressure protection pressure switch, a fluid inlet of the second high-pressure protection pressure switch is connected to the second product water outflow pipeline, and the second high-pressure protection pressure switch and the first high-pressure protection pressure switch are electrically connected in parallel between the power supply apparatus and the pump; and the second high-pressure protection pressure switch is configured such that: when a pressure in the second product water outflow pipeline is less than a second pressure threshold, the second high-pressure protection pressure switch is turned on; and when the pressure in the second product water outflow pipeline is greater than or equal to the second pressure threshold, the second high-pressure protection pressure switch is turned off.

7. The reverse osmosis filtration system according to claim 2, wherein the product water outflow pipeline comprises a first product water outflow pipeline, and the faucet is operable such that the water outlet is selectively in communication with the first product water outflow pipeline; and the high-pressure control portion comprises:

a first pressure sensing element arranged to detect a pressure of the first product water outflow pipeline; and a controller configured to: receive a first pressure signal from the first pressure sensing element, wherein when the first pressure signal indicates that the pressure in the first product water outflow pipeline is less than a first pressure threshold, the controller allows the pump to work when it is powered.

8. The reverse osmosis filtration system according to claim 7, wherein the product water outflow pipeline further comprises a second product water outflow pipeline, and the faucet is operable such that the water outlet is selectively in communication with one or both of the first product water outflow pipeline and the second product water outflow pipeline;

the high-pressure control portion further comprises a second pressure sensing element arranged to detect a pressure of the second product water outflow pipeline; and the controller is configured to:

further receive a second pressure signal from the second pressure sensing element, wherein when the first pressure signal indicates that the pressure in the first product water outflow pipeline is less than the first pressure threshold, and/or the second pressure signal indicates that the pressure in the second product water outflow pipeline is less than a second pressure threshold, the controller allows the pump to work when it is powered; and when the first pressure signal indicates that the pressure in the first product water outflow pipeline is greater than or equal to the first pressure threshold, and the second pressure signal indicates that the pressure in the second product water outflow pipeline is greater than or equal to the second pressure threshold, the controller disables the pump.

9. The reverse osmosis filtration system according to claim 8, wherein the first pressure sensing element and/or the second pressure sensing element is a pressure sensor or a high-pressure protection pressure switch.

10. The reverse osmosis filtration system according to claim 2, wherein the pump is a speed-variable pump, and the high-pressure control portion is configured to control a rotational speed of the pump according to the pressure in the product water outflow pipeline.

11. The reverse osmosis filtration system according to claim 2, wherein the pump unit further comprises a filter arranged upstream of the low-pressure control portion.

12. The reverse osmosis filtration system according to claim 5, wherein the reverse osmosis filtration unit comprises a reverse osmosis filtration apparatus, the first product water outflow pipeline is a pure water outflow pipeline of the reverse osmosis filtration apparatus, and the first pressure threshold is a water storage pressure threshold of the reverse osmosis filtration apparatus.

13. The reverse osmosis filtration system according to claim 1, wherein the raw water pipeline is connected to a municipal tap water pipeline or a water storage container.

* * * * *